United States Patent [19]

Speakman

[11] Patent Number: 5,166,279

[45] Date of Patent: Nov. 24, 1992

[54] PROCESS FOR THE GAS PHASE (CO-)POLYMERIZATION OF ETHYLENE

[75] Inventor: John G. Speakman, Sausset les Pins, France

[73] Assignee: BP Chemicals Limited, London, England

[21] Appl. No.: 634,060

[22] Filed: Dec. 26, 1990

[30] Foreign Application Priority Data

Dec. 29, 1989 [FR] France .................... 89 17561

[51] Int. Cl.$^5$ .............................................. C08F 2/34
[52] U.S. Cl. ....................................... 526/97; 526/105; 526/901; 526/905; 526/352
[58] Field of Search ................. 526/97, 901, 905, 105, 526/106, 352

[56] References Cited

U.S. PATENT DOCUMENTS

| | | | |
|---|---|---|---|
| 4,011,382 | 3/1977 | Levine et al. ........................ | 526/96 |
| 4,321,159 | 3/1982 | Bressler et al. ..................... | 526/97 X |
| 4,517,345 | 5/1985 | Eve et al. ............................ | 526/105 |
| 4,522,987 | 6/1985 | Hogan et al. ....................... | 526/348.2 X |
| 4,564,660 | 1/1986 | Williams et al. ................... | 526/901 X |

FOREIGN PATENT DOCUMENTS

| | | | |
|---|---|---|---|
| 0018108 | 10/1980 | European Pat. Off. ............ | 526/105 |
| 0035124 | 9/1981 | European Pat. Off. . | |
| 0175532 | 3/1986 | European Pat. Off. . | |
| 0272553 | 6/1988 | European Pat. Off. ............ | 526/97 |
| 0314385 | 5/1989 | European Pat. Off. . | |

Primary Examiner—Fred Teskin
Attorney, Agent, or Firm—Brooks Haidt Haffner & Delahunty

[57] ABSTRACT

The present invention relates to a process for (co-)polymerizing ethylene in a gaseous phase, by means of a fluidized and/or mechanically stirred bed reactor, with the help of a catalyst comprising a chromium oxide and a titanium compound, supported on a refractory oxide and activated by a heat treatment. The process is characterized in that the catalyst is introduced into the reactor in the form of a dry powder consisting of particles free from prepolymer and the (co-)polymerization is carried out in the presence of an organoaluminium compound. The (co-)polymer thus obtained has substantially low catalyst residues, and an improved stress cracking resistance.

10 Claims, No Drawings

PROCESS FOR THE GAS PHASE (CO-)POLYMERIZATION OF ETHYLENE

The present invention relates to a gas phase process for the polymerization of ethylene or copolymerization of ethylene with at least one alpha-olefin with the aid of a catalyst comprising a chromium oxide and a titanium compound, which are associated with a granular support based on refractory oxide, and are activated by a heat treatment.

It is already known to polymerize ethylene, by itself or mixed with other alpha-olefins in the presence of a catalyst comprising a chromium oxide compound associated with a granular support based on refractory oxide and activated by a heat treatment. These catalysts, employed in the polymerization of alpha-olefins and in particular of ethylene have been described in many patents such as, for example, British Patents No. 790,195 and No. 804,641.

It is also known that such catalysts preferably include at least one compound of chromium with a degree of valency equal to 6, in such quantity that the said catalysts contain at least 0.05% by weight of chromium. It has been found, however, that the polymerization of alpha-olefins can also be performed in good conditions by means of chromium compounds of various degrees of valency, largely lower than 6, these compounds being obtained, for example, by reduction of hexavalent chromium compounds before the beginning of the polymerization and/or during the polymerization itself.

It is known that these catalysts can be prepared by deposition of a chromium compound such as a chromium oxide, or of a chromium compound capable of being converted into chromium oxide by calcination, onto a granular support based on refractory oxide, followed by activation by heat treatment at a temperature of at least 250° C. and not exceeding the temperature at which the granular support begins to sinter, so that at the end of the heat treatment the chromium compound may be at least partially in the hexavalent state. Furthermore, there are many methods for modifying these catalysts, especially by incorporating titanium compounds or fluorine compounds therein.

It is known, furthermore, to polymerize or copolymerize ethylene in gaseous phase in the presence of such catalysts, especially under a pressure of less than 5 MPa and especially in a fluidized bed reactor in which the solid polymer being formed is kept in a fluidized state by means of an upward stream comprising a gas mixture consisting essentially of ethylene and optionally of alpha-olefin to be polymerized. The gas mixture leaving the reactor is generally cooled before being recycled into the reactor, with the addition of a complementary quantity of ethylene and optionally of alpha-olefins corresponding to the quantity which is consumed. The fluidization velocity in the fluidized bed reactor must be sufficiently high to ensure the homogenization of the fluidized bed and to remove efficiently the heat released by the polymerization reaction. The catalyst may be introduced into the fluidized bed reactor continuously or intermittently. Draining of the manufactured polymer may also be carried out continuously or intermittently. Thus, various methods of gas phase manufacture of polyolefins in the presence of chromium oxide-based catalysts have already been described in many patents such as, for example, British Patents No. 810,948 and No. 1,014,205 and U.S. Pat. Nos. 2,936,303, 3,002,963, 3,023,203 and 3,300,457.

According to European Patent Application No. 175,532 it is also known to polymerize or copolymerize ethylene in gaseous phase with the aid of a catalyst comprising a chromium oxide and a titanium compound, which are associated with a support based on refractory oxide and are activated by a heat treatment, this catalyst being converted into the form of a prepolymer in suspension beforehand.

According to U.S. Pat. No. 4,517,345 it is also known to polymerize or copolymerize ethylene in suspension in a saturated liquid aliphatic hydrocarbon, with the aid of a catalyst comprising a chromium oxide and a titanium compound, which are associated with a support based on refractory oxide and are activated by a heat treatment, and in the presence of an organoaluminium compound. However, the polymers or copolymers thus obtained have relatively mediocre properties, especially insofar as stress cracking resistance is concerned.

It has now been found that it is possible to manufacture by a gas phase polymerization process ethylene polymers or copolymers which have, at the same time, extremely low contents of catalyst residues and a high stress cracking resistance. More particularly, the present invention relates to an improved process for (co-)polymerization of ethylene in gaseous phase with the aid of a catalyst comprising a chromium oxide and a titanium compound, used in the form of a dry powder consisting of particles which are free from prepolymer. The (co-)polymerization must, furthermore, be carried out in the presence of an organometallic compound chosen from organoaluminium compounds. The combination of the nature of this catalyst and of this organometallic compound with the conditions of their use in gas phase polymerization results surprisingly in the production of an ethylene (co-)polymer in a very high yield and with an improved resistance to stress cracking. It was also surprisingly found that the (co-)polymer of ethylene produced according to the present process may have a reduced die swell, when it is used in an extrusion machine for transforming the (co-)polymer powder into pellets or into finished articles. The improvement of this particular property provides a better control of the manufacturing of the finished articles and an advantageous reducing of the weight of each finished article manufactured.

The subject of the present invention is therefore a process for the polymerization of ethylene or copolymerization of ethylene with at least one alpha-olefin containing from 3 to 12 carbon atoms, carried out in gaseous phase in a reactor containing a fluidized and/or mechanically stirred bed, with the aid of a catalyst comprising a chromium oxide and a titanium compound, which have been associated with a granular support based on refractory oxide and are activated by a heat treatment, this catalyst having weight contents of chromium and of titanium ranging from 0.05 to 10% and from 0.5 to 20% respectively, a process characterized in that the catalyst is used in the reactor in the form of a dry powder consisting of particles which are free from prepolymer, and in that the polymerization or copolymerization is carried out in the presence of an organoaluminium compound corresponding to the general formula $AlR_nX_{3-n}$ in which formula R is an alkyl radical containing from 1 to 10 carbon atoms, X is a hydrogen atom or an alkoxy radical e.g. of 1 to 6 carbon atoms and n is an integral or fractional number ranging from 1 to 3.

The catalyst employed according to the invention can be obtained according to a large number of processes. One of the preferred processes consists, in a first stage, in associating a chromium compound such as a chromium oxide generally of formula $CrO_3$, or a chromium compound capable of being converted into chromium oxide by calcination, such as, for example, a chromium nitrate or sulphate, an ammonium chromate, a chromium carbonate, acetate or acetylacetonate or a tert-butyl chromate, with a granular support based on refractory oxide such as, for example, silica, alumina, zirconium oxide, thorium oxide, titanium oxide or mixtures or coprecipitates of two or more of these oxides. In a second stage, the catalyst is impregnated with a titanium compound such as titanium tetraisopropoxide. Suitable compounds and impregnation methods are described in French Patent No. 2,134,743. Thus impregnated, the catalyst is then subjected to a so-called activation operation, by heat treatment at a temperature of at least 250° C. and not exceeding the temperature at which the granular support begins to sinter; the heat treatment temperature is generally are between 250° and 1200° C., and preferably between 350° and 1000° C. The heat treatment is carried out under a nonreductive atmosphere, preferably under an oxidizing atmosphere, generally consisting of a gas mixture comprising oxygen such as, for example, air. The duration of the heat treatment may be between 5 minutes and 24 hours, preferably between 30 minutes and 5 hours, so that at the end of this treatment the chromium compounds are at least partially in the hexavalent state.

The granular supports based on refractory oxide which are employed in the preparation of the catalysts are generally in the form of solid particles which may have a mass-average diameter of between 20 and 300 microns, preferably between 40 and 200 microns. The granular supports may be obtained by various known processes, especially by precipitation of silicon compounds, such as silica, from a solution of an alkali metal silicate or else by coprecipitation of a refractory oxide gel or hydrogel from solutions containing at least two compounds chosen from silicon, titanium, zirconium, thorium and aluminium compounds. Such processes are described in particular in U.S. Pat. Nos. 4,053,436 and 4,101,722.

Another method of preparing the catalyst consists firstly in preparing a silica and titanium oxide support by calcination of a titanium compound such as titanium tetraisopropoxide deposited on silica, at a temperature of between 500° and 900° C., under a dry air or nitrogen atmosphere, and then in impregnating the said support with a chromium compound such as tert-butyl chromate, and in subjecting the product obtained to the so-called activation operation by heat treatment. A method of this kind is described, for example, in U.S. Pat. No. 3,879,362.

It is also possible to employ a catalyst obtained in a first stage by coprecipitation of a gel or hydrogel such as defined above, in the presence of a chromium compound and of a titanium compound, so that a cogel is formed containing, on the one hand, at least one refractory oxide such as silica or alumina and, on the other hand, a chromium compound and a titanium compound. In a second stage the cogel is dried and is then subjected to the so-called activation operation by heat treatment.

Another method of preparing the catalyst is described in British Patent No. 1,391,771. It consists in heat-activating a catalyst supported on a refractory oxide such as silica, comprising a chromium oxide, in the presence of, on the one hand, a titanium tetraisopropoxide and, on the other hand, a fluorine compound such as ammonium hexafluorotitanate, tetrafluoroborate or hexafluorosilicate.

The catalyst employed according to the invention includes chromium in a weight content ranging from 0.05 to 10%, preferably from 0.1 to 3%, titanium in a weight content ranging from 0.5 to 20%, preferably from 1 to 5%, and optionally fluorine in a weight content ranging from 0.05% to 10%, preferably from 0.5 to 5%. It is important that the catalyst should be introduced in the gas phase polymerization reactor in the form of a powder consisting of particles which are free from prepolymer. It consists of particles which have a mass-average diameter of between 20 and 300 microns, preferably between 40 and 200 microns. It is preferable, furthermore, that the catalyst should not come into contact with any liquid hydrocarbon such as alcanes or aromatics which are liquid under the normal conditions of temperature and pressure, e.g. n-hexane, n-heptane, benzene or toluene, between the time when the catalyst was heat-activated and the time when it is introduced into the gas phase polymerization reactor. Also, it is recommended to introduce the catalyst into the gas phase polymerization reactor in the form of a dry powder, conveyed by a gas stream, and not in the form of a suspension in a liquid hydrocarbon. The gas stream which may be used for introducing the catalyst, preferably is a substantially inert gas in relation to the catalyst, e.g. nitrogen, hydrogen, alkane having 1 to 4 carbon atoms, such as methane or ethane, or a mixture of these gases.

According to the invention, the gas phase ethylene polymerization or copolymerization is carried out in the presence of an organometallic compound chosen from organoaluminium compounds corresponding to the general formula $AlR_nX_{3-n}$ in which R is an alkyl radical containing from 1 to 10 preferably 1 to 8 especially 1 to 4 carbon atoms, X is a hydrogen atom or an alkoxy radical containing from 1 to 10 preferably 1 to 6 carbon atoms, and n is an integral or fractional number ranging from 1 to 3, preferably 2 to 3. The organometallic compound may also be a mixture of these organoaluminium compounds. It is preferred to employ a trialkylaluminium with each alkyl group of 1 to 10, preferably 1 to 8, especially 1 to 4 carbon atoms, e.g. triethylaluminium, tri-n-propylaluminium, tri-n-butylaluminium or triisobutylaluminium.

The organometallic compound may be added to the catalyst before the latter is introduced into the gas phase polymerization reactor. In this case, the addition is preferably carried out by bringing the organometallic compound into contact with the catalyst in the form of a dry powder. The organometallic compound is employed in the form of a pure liquid or of a solution in a liquid hydrocarbon e.g. at a concentration higher than 5%, preferably 10% by weight or more of the organo metallic compound, or, preferably, in a gaseous form. In the latter case the organometallic compound may be advantageously vaporized before it is brought into contact with the catalyst. One of the best forms, which is suitable for bringing the organometallic compound into contact with the catalyst is to perform this contact during the introduction of the catalyst into the gas phase polymerization reactor, especially when the catalyst is conveyed in the form of a dry powder in a gas stream containing the organometallic compound in a vapour form. The gas stream may contain hydrogen or an inert gas such as nitrogen or a saturated hydrocarbon such as described above.

The organometallic compound may also be introduced directly into the gas phase polymerization reactor. In this case it may be used in the form of a pure liquid or of a solution in a saturated aliphatic hydrocarbon or preferably in a vapour form.

The organometallic compound may also be advantageously used by combining the above two methods. In particular, it may be partly added to the catalyst before it is introduced into the reactor and partly introduced into the reactor separately from the catalyst.

Whatever the method employed for using the organometallic compound, the latter is preferably employed in such quantity that the atomic ratio of Al to the chromium present in the gas phase polymerization reactor does not exceed 100, and is preferably between 0.05 and 20 and more particularly between 0.2 and 4.

The contact of the catalyst with ethylene or with a mixture of ethylene and of at least one other alpha-olefin, in conditions of gas phase polymerization or copolymerization, especially in a reactor containing a fluidized and/or mechanically stirred bed, is brought about using techniques which are known per se. In particular, in a fluidized bed reactor the gas mixture containing ethylene and optionally at least one other alpha-olefin to be polymerized passes in an upward stream through the bed, consisting of particles of catalyst and polymer or copolymer being formed. The ethylene and optionally the other alpha-olefin are introduced into the fluidized bed reactor at a temperature such that the reaction mixture is at a temperature of below the temperature at which the polymer or copolymer particles begin to soften and to form agglomerates, preferably below 115° C. and at least 50° C., particularly from 70° C. or 80° C. to 95° C. for producing copolymers of ethylene with density of 0.91 to 0.94, especially from 90° C. or 95° C. to 110° C. or 115° C. for producing homopolyethylene or copolymers of ethylene with density higher than 0.94 and lower than 0.97. The fluidization velocity of the gas mixture is preferably relatively high, so as to ensure a good homogenization of the fluidized bed, without resorting to a mechanical means of homogenization, in order to remove efficiently the heat released by the polymerization and to increase the polymerization yield. This fluidization velocity is generally between approximately 30 and 120 cm/s, preferably between 40 and 100 cm/s and more particularly between 50 and 80 cm/s. On passing through the fluidized bed, only a part of the ethylene and of the optional other alpha-olefin is polymerized on contact with the growing polymer or copolymer particles. The fraction of the ethylene and the optional other alpha-olefin which has not reacted leaves the fluidized bed and passes through a cooling system, intended to remove the heat produced during the reaction, before being recycled into the fluidized bed reactor by means of a compressor.

The total pressure in the gas phase polymerization reactor may be close to atmospheric pressure but is preferably higher in order to increase the polymerization rate. In may be from 0.5 to 5 MPa, especially 0.8 to 4 MPa and preferably between 1.2 and 2.5 MPa.

With a view to controlling and, in particular, reducing the average molecular weight of the polymers or copolymers which are manufactured, it is possible not only to increase the polymerization temperature but also to increase the quantity of the organometallic compound introduced into the reaction mixture.

The gas mixture may also include an inert component in such quantity that the molar ratio of the inert component to ethylene and the optional other alpha-olefins is between 0 and 5, especially between 0.1 and 2 and preferably between 1 and 2. The inert component may be chosen from inert gases such as nitrogen or inert hydrocarbons, in particular saturated aliphatic hydrocarbons containing from 1 to 7 carbon atoms, such as methane, ethane, propane, butane, pentane, isopentane and hexane or a mixture of these hydrocarbons. In particular, it makes it possible to improve substantially the removal of heat of reaction and to modify the polymerization kinetics favourably.

In addition to ethylene, the gas mixture may contain one or more other alpha-olefins containing preferably from 3 to 12 carbon atoms, preferably chosen from propylene, 1-butene, 1-hexene, 4-methyl-1-pentene and 1-octene.

It was surprisingly found that when during the polymerization process of the present invention the gas mixture contains hydrogen, the (co-)polymer thus obtained has a substantially unchanged average molecular weight, but a die swell which is appreciably reduced. It seems that in the particular conditions of the present invention, the hydrogen acts as a limiting or transfer chain agent only with (co-)polymer chains having a specifically high or ultrahigh molecular weight, e.g. having a molecular weight higher than $0.5 \times 10^6$ or preferably higher than $10^6$. This result seems to be independent of the molar ratio of hydrogen to ethylene and optional other alpha-olefin. The beneficial effect on the die swell is particularly obtained when the partial pressure of hydrogen in the gas mixture is from 0.15 to 1.5, preferably 0.2 to 0.8 especially 0.3 to 0.6 MPa, and preferably when the polymerization temperature is relatively high, e.g. from 70° to 115° C., particularly from 80° to 110° C. This effect also comes from the fact that the catalyst is used in the form of a dry powder free from prepolymer, in combination with the organo aluminium compound.

According to the invention, the polymerization or copolymerization is advantageously stopped when the polymer or copolymer contains preferably less than $2 \times 10^{-4}$ e.g. $10^{-5}$ millimoles of chromium per gram. In particular, it is surprising to find that when the catalyst is employed in a nonprepolymerized form, it makes it possible to have extremely high activity levels in a gas phase (co-)polymerization.

It is thus possible to manufacture, in highly satisfactory and highly simplified industrial conditions, a large number of ethylene polymers and copolymers of ethylene and of another alpha-olefin, such as high density polyethylenes with density higher than 0.940, e.g. ethylene homopolymers and copolymers of ethylene with another alpha-olefin preferably containing from 3 to 12 carbon atoms, which have a weight content of ethylene-derived units higher than or equal to approximately 97%, or linear low density polyethylenes with density from 0.910 to 0.940, consisting of a copolymer of ethylene and of one or more other alpha-olefins preferably containing from 3 to 12 carbon atoms, which have a weight content of ethylene-derived units of approximately between 80 and 97%.

The ethylene polymers and the copolymers of ethylene with another alpha-olefin obtained according to the present invention have the advantage of exhibiting a relatively broad molecular weight distribution. The latter can be characterized using the ratio of the weight-average molecular weight, Mw, to the number-average molecular weight, Mn, of the polymers or copolymers, these being measured by gel permeation chromatography (GPC), this ratio being generally higher than 6 e.g. 6 to 20. This molecular weight distribution can also be characterized using the flow parameter, n, which is higher than 1.8 and generally higher than 2.0 e.g. 2 to 3, this flow parameter being calculated according to the following equation:

$$n = \log(MI21.6/MI8.5)/\log(21.6/8.5)$$

in which MI21.6 and MI8.5 are the melt indices of the polymers or copolymers, measured at 190° C. under a load of 21.6 kg (ASTM standard D 1238-57 T, condition F) and of 8.5 kg respectively.

Surprisingly, it has also been found that, by virtue of the combination of the particular natures of the catalyst and of the organometallic compound employed, and of the particular conditions of their use in the gas phase polymerization reactor, the ethylene polymers or copolymers thus obtained exhibit a relatively high stress cracking resistance. When measured according to ASTM standard D-1693, this is equal to or greater than 50 hours e.g. 50 to 100 hours, preferably 60 hours in the case of a homopolyethylene with a density equal to $0.950 + 0.001$ and a melt index of $30 + 5$ g/10 minutes, measured at 190° C. under a 21.6 kg load.

Measurement of the molecular weight distribution

The molecular weight distribution of a polymer or copolymer is calculated in accordance with the ratio of the weight-average molecular weight, Mw, to the number-average molecular weight, Mn, of the polymer or copolymer, from a molecular weight distribution curve obtained by means of a gel permeation chromatograph of "Waters 150° C." R Trademark (High Temperature Size Exclusion Chromatograph), the operating conditions being the following:

solvent: 1,2,4-trichlorobenzene
solvent flow rate: 1 ml/minute
three columns of "Shodex" R model "AT 80 MS" trademark
temperature: 150° C.
sample concentration: 0.1% by weight
injection volume: 500 microliters
detection by a refractory integral with the chromatograph
standardization with the aid of a high density polyethylene sold by BP Chemicals under the trade name "Rigidex 6070 EA" TM: Mw=65,000 and Mw/Mn=4.
and of a high density polyethylene which has a Mw: 210,000 and Mw/Mn=17.5.

The following nonlimiting examples illustrate the invention.

EXAMPLE 1 a) Preparation of a catalyst 120 kg of an unactivated catalyst sold under the trade name "EP30" R by the company Joseph Crosfield and Sons (Warrington, Great Britain), containing 1% by weight of chromium in the form of trivalent chromium acetate, were introduced into a fluidized bed reactor heated to 93° C., through which an upward stream of dry nitrogen is circulated. The reactor was then heated to 232° C. at a rate of 66° C./h and was kept at this temperature for 4 hours. At the end of this period a mixture of isopropyl titanate and of isobutyl titanate, sold under the trade name "Tilcom BIP"(TM) by the Company "Titanium Intermediates Limited" (Billingham, Great Britain) was introduced into the reactor in a total quantity of 95 moles of titanium. Thus impregnated, the catalyst was kept at 232° C. for 4 h. The nitrogen stream in the reactor was then replaced by a dry air stream and the catalyst was heated successively from to 550° C. at a rate of 66° C., kept at 550° C. for 5 hours, and was then cooled to 232° C. at a rate of 66° C./h. The dry air stream was then replaced by a dry nitrogen stream and the catalyst was cooled slowly to room temperature (20° C.).

90 kg of an activated catalyst were recovered in the form of a powder containing 3.8% by weight of titanium and 1% by weight of chromium, with a mass-average diameter of 157 microns.

b) Polymerization of ethylene in the gaseous phase 200 g of an inert and anhydrous polyethylene powder which had a mass-average diameter of 500 microns were introduced as a powder charge, under nitrogen atmosphere, into a 2.6-liter stainless steel reactor equipped with a helical stirrer rotating at 250 revolutions per minute and heated to 100° C., followed by 0.194 millimoles of triethylaluminium (TEA). After the time needed to disperse the TEA in the powder charge (approximately 15 minutes), 0.2 g of the previously prepared catalyst were introduced into the reactor in the form of a dry powder, followed by ethylene until a pressure of 1.5 MPa was obtained, followed by a steady flow rate of ethylene of 200 g/h during 2 hours. At the end of this period approximately 400 g of polyethylene had been produced and were separated by screening from the 200 g of powder charge introduced initially.

During the polymerization it was found that the catalyst activity had been of 11.820 kg of polyethylene per millimole of chromium, per hour and per MPa of ethylene.

Furthermore, the polyethylene produced during the polymerization exhibited the following characteristics:
melt index, measured at 190° C. under an 8.5 kg load (MI8.5): 3.8 g/10 minutes
melt index, measured at 190° C. under a 21.6 kg load (MI21.6): 30 g/10 minutes
density: 0.950 g/cm$^3$
bulk density: 0.32 g/cm$^3$
mass-average particle diameter: 900 microns
stress cracking resistance (ASTM method D-1693): 60 hours.

EXAMPLE 2 (COMPARATIVE)

a) Prepolymerization in suspension 7,000 liters of n-hexane were introduced under nitrogen atmosphere into a 30 m$^3$ stainless steel reactor equipped with a stirrer rotating at 140 revolutions per minute and were heated to 75° C., followed by the introduction of 9.5 moles of TEA and 234 kg of the catalyst prepared in Example 1. Ethylene was then introduced at a flow rate of 300 kg/h during 8 hours. At the end of this period the prepolymer suspension thus obtained was kept at a temperature of 75° C. for 30 minutes, in order to consume as much as possible the unreacted ethylene. The reactor was then degassed and cooled to 60° C.

12 m³ of n-hexane, preheated to 60° C., were added to the prepolymer suspension, which was kept stirred in these conditions for 15 minutes, before 12 m³ of the liquid phase were extracted from this suspension. This operation was repeated three times, and the prepolymer suspension was then cooled to room temperature (20° C.) and 17 moles of TEA were added to it.

After drying under nitrogen at 60° C., 2.3 tons of prepolymer were obtained in the form of a powder consisting of particles which had a mass-average diameter of 255 microns and which contain $1.94 \times 10^{-2}$ millimoles of chromium per gram and less than 0.5% by weight of polymer soluble in hexane at 60° C.

b) Polymerization of ethylene in the gaseous phase

The procedure was exactly as in Example 1, except the fact that 2 g of the prepolymer previously prepared were introduced into it in the form of a dry powder instead of 0.2 g of the catalyst. At the end of 2 hours of polymerization it was found that the catalyst activity was 4220 g of polyethylene per millimole of chromium, per hour and per MPa of ethylene prepared in suspension.

Compared with Example 1, a substantial reduction in the activity of the catalyst was observed when the latter was used in the form of a prepolymer prepared in suspension.

EXAMPLE 3 (COMPARATIVE)

Polymerization of ethylene in suspension in isobutane 0.2 g of the catalyst prepared according to Example 1 in the form of a dry powder were introduced into a 2.3-liter stainless steel reactor equipped with a stirrer rotating at 250 revolutions per minute and heated to 100° C., followed by 19 millimoles of TEA and 1 liter of isobutane. Ethylene was introduced into the reactor up to a pressure of 4.1 MPa, and this pressure was maintained by feeding ethylene continuously for 1 hours. At the end of this period, the reactor was cooled and degassed. 430 g of polyethylene were recovered with the following characteristics:
MI21.6 = 30 g/10 minutes
density = 0.950 g/cm³
stress cracking resistance (ASTM method D-1693): 42 hours.

The catalyst activity had been 5600 g of polyethylene per millimole of chromium, per hour and per MPa of ethylene.

It was found that the catalyst activity was lower by a factor of two than in Example 1, and that the stress cracking resistance of the polyethylene was lower when compared with that of the polyethylene obtained in Example 1.

EXAMPLE 4 (COMPARATIVE)

Polymerization of ethylene in the gaseous phase

The procedure was exactly as in Example 1, except the fact that TEA was not introduced into the reactor.

At the end of 2 hours' polymerization, 50 g of polyethylene had been produced. The catalyst activity had been 1480 g of polyethylene per millimole of chromium, per hour and per MPa of ethylene. It was particularly low when compared with that obtained in Example 1.

EXAMPLE 5

Polymerization of ethylene in the gaseous phase

The operation was carried out at 108° C. with the aid of a fluidized bed reactor of 3 m diameter, the fluidization being ensured by a gas mixture propelled at an upward velocity of 50 cm/s. The gas mixture consisted of ethylene, nitrogen and hydrogen, whose partial pressures (pp) were as follows:
hydrogen pp: 0.6 MPa
ethylene pp: 0.5 MPa
nitrogen pp: 0.706 MPa 8 tons of degassed anhydrous high density polyethylene powder were introduced into the reactor as a powder charge, followed by 24 moles of triethylaluminium. At the end of 2 hours, the catalyst prepared in Example 1 was introduced into the reactor at a flow rate of 0.5 kg/h and, at the end of 5 hours, TEA at a flow rate of 0.1 mol/h.

In these conditions, 2.5 t/h of a polyethylene powder which had the following characteristics were manufactured continuously:
density: 0.953 g/cm³
chromium content: 2 parts per million by weight (ppm)
MI21.6 = 26 g/10 minutes
mass-average particle diameter = 1200 microns
molecular weight distribution, Mw/Mn = 15.

When the polyethylene powder was transformed into finished articles by using an extrusion machine, the die swell of this polyethylene was very low.

EXAMPLE 6 a) Preparation of a catalyst

The preparation of the catalyst was carried out exactly as in Example 1, except the fact that the temperature of activation was 815° C. instead of 550° C.

b) Polymerization of ethylene in the gaseous phase 200 g of anhydrous polyethylene powder having a mass-average diameter of 500 microns were introduced as a powder change, under nitrogen atmosphere, into a 2.6 liter stainless steel reactor equipped with a helical stirrer rotating at 350 revolutions per minute and heated at 100° C., followed by 0.19 millimoles of TEA and then by a quantity of the catalyst prepared according to Example 1, corresponding to 0.038 millimoles of chromium, in the form of a dry powder. Hydrogen was introduced into the reactor until a presence of 0.3 MPa was obtained and then ethylene until a total pressure of 1.5 MPa was obtained, followed by a steady flow rate of ethylene of 200 g/h during 2 hours. At the end of this period, polyethylene had been produced with an activity of 14320 g of polyethylene per millimole of chromium, per hour and per MPa of ethylene. The polyethylene powder had the following features:
chromium content: 5 ppm
MI 21.6 = 25 g/10 minutes
bulk density = 0.34 g/cm³
mass-average particle diameter: 1000 microns.

When the polyethylene powder was transformed into finished particles by using an extrusion machine, the die swell of this polyethylene was lower than that of the polyethylene obtained in Example 1.

EXAMPLE 7 (COMPARATIVE)

Polymerization of ethylene in the gaseous phase

The operation was carried out exactly as in Example 6, except the fact that before the introduction of the catalyst into the reactor, 15 g of the catalyst was mixed and stirred with 500 ml of n-hexane to form a slurry during 18 hours at 20° C. Then, the catalyst was introduced into the reactor in the form of a slurry, in a quantity of 0.038 millimoles of chromium, identical to that used in Example 6.

Polyethylene had been produced with an activity of 11200 g of polyethylene per millimole of chromium, per hour and per MPa of ethylene, which was a substantially reduced activity compared with that obtained in Example 6.

The polyethylene powder had the following features:
chromium content: 7 ppm
MI 21.6 = 18 g/10 minutes
bulk density = 0.32 g/cm$^3$
mass-average particle diameter = 820 microns.

I claim:

1. A process for preparing ethylene homo- and copolymers having reduced die swell in an extrusion machine, said process being carried out in gaseous phase in a reactor containing a fluidized and/or mechanically stirred bed, in the presence of a catalyst comprising a silica precipitated from a solution of an alkali metal silicate, on which silica then is calcined a chromium compound and impregnated with a titanium compound or on which silica then is calcined a titanium compound and impregnated with a chromium compound, the resulting product being activated by a heat treatment to form the catalyst comprising a chromium oxide and titanium compound with weight contents of chromium and of titanium ranging from 0.05 to 10% and from 0.5 to 20% respectively, and said process being characterised in that the catalyst is used in the reactor in the form of a dry powder consisting of particles free from prepolymer, and in that the polymerisation or copolymerisation is carried out with a gas mixture containing ethylene, hydrogen and optionally at least one $C_3$–$C_{12}$ alpha olefin, under a total pressure of 0.5 to 5 MPa and at a temperature of 70° C. to 115° C., in the presence of an organometallic compound chosen from organoaluminium compounds corresponding to the general formula $AlR_nX_{3-n}$, in which R is an alkyl radical containing from 1 to 10 carbon atoms, X is a hydrogen atom or an alkoxy radical and n is an integer or fractional number ranging from 1 to 3.

2. Process according to claim 1, characterized in that the organometallic compound is used in such quantity that the atomic ratio of Al to the chromium present in the gas phase polymerization reactor does not exceed 100.

3. Process according to claim 1, characterized in that the organometallic compound is added to the catalyst before the latter is introduced into the gas phase polymerization reactor.

4. Process according to claim 1, characterized in that the organometallic compound is introduced separately from the catalyst into the gas phase polymerization reactor.

5. Process according to claim 1, characterized in that the catalyst has weight contents of chromium and of titanium ranging from 0.1 to 3% and from 1 to 5% respectively.

6. Process according to claim 1, characterized in that the organometallic compound is chosen from triethylaluminium, tri-n-propylaluminium, tri-n-butylaluminium and triisobutylaluminium.

7. Process according to claim 1, characterized in that the partial pressure of hydrogen in the gas mixture is from 0.15 to 1.5 MPa.

8. Process according to claim 1, characterized in that the gas mixture comprises an inert gas.

9. Process according to claim 1, characterized in that the temperature is from 80° C. to 110° C., the total pressure is from 0.8 to 4 MPa and the hydrogen is under a partial pressure of 0.15 to 1.5 MPa in the gas mixture.

10. A process according to claim 2, wherein the atomic ratio of Al to the chromium present in the gas phase polymerization reactor is between 0.05 and 20.

* * * * *